United States Patent
Allcock et al.

(10) Patent No.: US 6,482,910 B1
(45) Date of Patent: Nov. 19, 2002

(54) POLYNORBORNENES WITH PENDANT CYCLOTRIPHOSPHAZENES

(75) Inventors: Harry R. Allcock, State College, PA (US); Walter R. Laredo, Somerville, NJ (US)

(73) Assignee: The Penn State Research Foundation, University Park, PA (US)

( * ) Notice: Subject to any disclaimer, the term of this patent is extended or adjusted under 35 U.S.C. 154(b) by 22 days.

(21) Appl. No.: 09/644,592

(22) Filed: Aug. 23, 2000

Related U.S. Application Data

(60) Provisional application No. 60/150,632, filed on Aug. 25, 1999.

(51) Int. Cl.[7] .............................................. C08F 236/20
(52) U.S. Cl. ........................ 526/233; 526/280; 526/336
(58) Field of Search ................................. 526/193, 233, 526/280, 281, 336

(56) References Cited

U.S. PATENT DOCUMENTS

| | | |
|---|---|---|
| 4,029,634 A | 6/1977 | Meredith et al. |
| 4,405,738 A | 9/1983 | McNeely et al. |
| 4,614,788 A | 9/1986 | Dettloff et al. |
| 4,668,589 A | 5/1987 | Kumar et al. |
| 4,772,722 A | 9/1988 | Lukacs, III |
| 5,344,501 A | 9/1994 | Hashimoto et al. |

FOREIGN PATENT DOCUMENTS

| | | |
|---|---|---|
| JP | 1 272 635 | 10/1989 |
| JP | 5 148 424 | 6/1993 |

OTHER PUBLICATIONS

Allcock, et al., "Polyphosphazenes bearing polymerizable pyrrole, thiophene and furan side groups: synthesis and chemical oxidation" by NTIS., Abstr. No. 243,408 92(16) (1992).

Allen & Bright, et al., "Organophosphazenes. 16. Synthesis and reaction of (1–alkoxyvinyl)fluorocyclotriphospazenes" Inorg. Chem. 22(9): 1291–5 (1983).

Allen, "Aryl–substituted fluorophosphazenes. VIII. Carbon–13 nuclear magnetic resonance parameters for phenyl–substituted fluorocyclotriphosphazenes" J. Organomet. Chem. 125(2): 215–18 (1977).

Allen, "Hybird Inorganic–Organic Polymers Derived from Organofunctional Phosphazenes," Gov. Rep. Announce. Index (U. S.), 87(23), Abstr. No. 753,600 (1987).

(List continued on next page.)

Primary Examiner—David W. Wu
Assistant Examiner—R. Harlan
(74) Attorney, Agent, or Firm—Holland & Knight LLP

(57) ABSTRACT

A polymer composition comprising a polynorbonene backbone and pendant cyclotriphosphazene groups has been developed. The pendant cyclotriphosphazene group can have various substituents such as C1–C10 alkyl, C1–C10 haloalkyl, C3–C6 cycloalkyl, phenyl, substituted phenyl, aryl, —$(CH_2CH_2OCH_2CH_2)_nOCH_3$ in which n is a positive integer, aminoalkyl, alkoxyalkyl, phenoxyalkyl, aryloxyalkyl and amidoalkyl. The polynorbonene backbone can have substituents such as H, $CH_3$, X which is a halo group, and C2–C6 alkyl, C3–C6 cycloalkyl, C2–C6 alkoxy, phenoxy, and aryloxy. In a preferred embodiment, the pendant triphosphazene group can have either —$CH_2CF_3$, phenyl, 4-ethylcarboxylatophenyl, —$CH_2CH_3$, or —$CH_2CH_2OCH_2CH_2OCH_3$ while the polynorbonene backbone can have H and low alkyl groups. The polyphosphazene compositions can be prepared readily via ring-opening-metathesis-polymerization of an olefin having norbornene structure with pendant cyclotriphosphazene groups. The polyphosphazene compositions disclosed are useful as elastomers, optical materials, electrically conductive materials, biomedical materials, compatibilizing agents, surfactants, additives for coatings, and as flame retardants.

12 Claims, 1 Drawing Sheet

OTHER PUBLICATIONS

Allen, et al., "Organophosphazenes. 16. Synthesis and reactions of (1–alkoxyvinyl)flurocyclotriphosphazenens" NTIS Report (TR–12; Order No. AD–A122591) Gov. Rep. Announce. Index (U. S.), 83(8), 1512 (1983).

Allcock, "Ring–opening metathesis polymerization of phophazene–functionalized norbornenes," *Macromolecules* 32:7719–7725 (1999).

Allen, et al., "Reaction of Polymers with pendent cyclophosphazenes," *ACS Polymer Preprint* 32:479–480 (1996).

R¹ = Ph(a)
  = $CH_2CF_3$ (b)
  = p-(ethyl carboxyl)phenyl(c)
  = $CH_2CH_3$ (d)
  = -$CH_2CH_2OCH_2CH_2OCH_3$ (e)

POLYNORBORNENES WITH PENDANT CYCLOTRIPHOSPHAZENES

CROSS-REFERENCE TO RELATED APPLICATIONS

Priority is claimed to U.S. Provisional Applications No. 60/150,632 filed Aug. 25, 1999.

BACKGROUND OF THE INVENTION

The present invention relates generally to polynorbornene and cyclotriphosphazene compositions.

A large number of polymers containing a variety of phosphazene groups have been prepared in the past several decades. The focus of these efforts has been directed to the incorporation of phosphazene or polyphosphazene into organic or inorganic polymer backbones. Numerous polymer compositions containing phosphazene groups or polyphosphazene backbones are known which contain linear phosphazene or polyphosphazene structures. See, for example, Hybrid inorganic-organic polymers derived from organofunctional phosphazenes. Allen, C. W. NTIS Report (TR-7; Order No. AD-A183612) Gov. Rep. Announce. Index (U. S.) 1987, 87(23), Abstr. No. 753,600.

Phosphazene-containing compositions are useful in a variety of applications including elastomers, optical materials, electrically conductive materials, biomedical materials, compatibilizing agents, surfactants, additives for coatings, and flame retardants. The electronic structure of a phosphazene-containing material is critical as to the chemical, as well as physical, properties of a material made of such phosphazene-containing material. For example, the electric conductivity of a phosphazene-containing material, which largely reflects the ease of the electrons to flow along the molecular backbone of such material, correlates positively to the content of π-stacking structure in the molecular backbone of such material. See, for example, "Electrically conductive phosphazene polymer compositions" Jpn. Kokai Tokkyo Koho by Sato (1993); "Polyphosphazenes bearing polymerizable pyrrole, thiophene and furan side groups: synthesis and chemical oxidation" by Allcock, et al., NTIS. Report (TR-68; Order No. AD-A249747) Gov. Rep. Announce. Index (U. S.) 1992, 92(16), Abstr. No. 243,408; "Electrically conductive polyorganophosphazenes". Jpn. Kokai Tokkyo Koho by Kajiwara, et al., (1989). Hence, the creation of a r-stacking structure or modulation of the existing π-stacking structure in a composition will affect the electrical conductivity of the composition. Similarly, the creation of a π-stacking structure or modulation of the existing π-stacking structure in a composition will affect the heat-conductivity of the composition. Moreover, linear or non-linear optical properties of an optical material can be affected by the modulation of the electronic properties of the material.

It would therefore be advantageous to develop new polymer compositions having phosphazene or polyphosphazene groups or moieties, utilizing one or more of these properties.

Cyclotriphosphazene compositions are known. For example, U.S. Pat. No. 4,668,589 to Kumar et al. discloses an adduct of epoxy resin and cyclotriphosphazene, wherein the three phosphorous atoms of the cyclotriphosphazene ring are modified with six phenoxy or aryloxy groups. The cyclotriphosphazene component serves as a curing agent of the epoxy resin. Similarly, U.S. Pat. No. 4,614,788 to Dettloff, et al. discloses an epoxy resin cured by a cyclotriphosphazene compound such as hexakis(n-propylamino) cyclotriphosphazene. The resin reportedly has an enhanced glass transition temperature (Tg) value compared to a similar composition without the phosphazene compound.

U.S. Pat. No. 4,405,738 to McNeely, et al. discloses polyester polymers and copolyester polymer compositions incorporating cyclotri- or cyclotetra-phosphazenes. The modifying groups on the cyclotriphosphazene or cyclotetraphosphazene ring are six or eight dialkylphosphinylmethylenoxy groups. Halogen-substituted tricyclophosphazene compounds also have been added to polymers such as polyamides and polyolefins, as disclosed in U.S. Pat. No. 4,029,634 to Meredith, et al. U.S. Pat. No. 5,344,501 to Hashimoto et al. discloses a solar cell which includes a protective layer formed by polymerizing cyclotriphosphazene. These patents describe cyclophosphazenes as adducts, epoxy resin curing agents or solar cell protective materials. As adducts of polymer compositions, the cyclophosphazenes probably retain their respective free chemical compositions and structures. However, as curing agents or solar cell protective materials, cyclophosphazenes probably polymerize during the application process, destroying the cyclic structure of cyclophosphazene molecules. The reactions of cyclophosphazenes in these references probably produce linear polyphosphazenes. It would be advantageous to produce polymer composition with cyclophosphazenes while retaining the cyclic structure of cyclophosphazene molecules.

It is therefore an object of the present invention to provide new polymer compositions having various organic or inorganic functionalities and, thus, having different chemical and physical properties.

It is another object of the present invention to provide synthetic methods for the preparation of polymer compositions incorporating cyclotriphosphazene groups.

SUMMARY OF THE INVENTION

Polymer compositions and methods for their synthesis are provided wherein the compositions include a polynorbornene backbone and pendant cyclotriphosphazene groups, having the formula

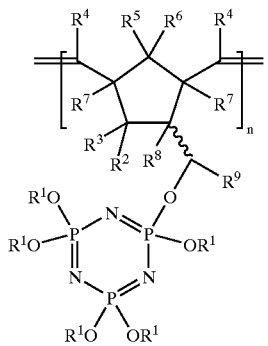

wherein $R^1$ is C1–C10 alkyl, C1–C10 haloalkyl, C3–C6 cycloalkyl, phenyl, substituted phenyl, aryl, —$(CH_2CH_2OCH_2CH_2)_nOCH_3$ in which n is a positive integer, aminoalkyl, alkoxyalkyl, phenoxyalkyl, aryloxyalkyl and amidoalkyl; and wherein $R^2$, $R^3$, $R^4$, $R^5$, $R^6$, $R^7$, $R^8$ and $R^9$ are groups selected from the group consisting of H, $CH_3$, X which is a halo group, and C2–C6 alkyl, C3–C6 cycloalkyl, C2–C6 alkoxy, phenoxy, and aryloxy.

In a preferred embodiment, $R^1$ is either —$CH_2CF_3$, phenyl, 4-ethylcarboxylatophenyl, —$CH_2CH_3$, or —$CH_2CH_2OCH_2CH_2OCH_3$. In another preferred embodiment of the polymer composition, $R^2$, $R^3R^4$, $R^5$, $R^6$, $R^7$, $R^8$ and $R^9$ are H.

The polyphosphazene compositions can be prepared via ring-opening-metathesis-polymerization of an olefin having norbornene structure with pendant cyclotriphosphazene groups. The polyphosphazene compositions described herein are useful as elastomers, optical materials, electrically conductive materials, biomedical materials, compatibilizing agents, surfactants, additives for coatings, and flame retardants.

BRIEF DESCRIPTION OF THE DRAWINGS

In FIG. 1 is shown the synthesis of cyclotriphosphazene derived norbornenes and their subsequent polymerization with a late transition metal carbene complex known as Grubbs Catalyst. In this context, initiator will be used instead of catalyst. Five of the chlorine atoms of hexachlorocyclotriphosphazene (1) are carefully substituted with the shown side groups to form a penta-substituted monochloro cyclotriphosphazene trimer (2). The side groups differ with regard to their hydrophobicity, hydrophilicity, steric bulk, aromaticity, conformational flexibility, and electron donating/withdrawing properites at the site of attachment with the phosphorus atoms. The remaining chlorine atom of 2 is treated with the metal-alkoxide derivative of the norbornene derivative 3 (mixture of endo and exo isomers). This results in complete replacement of the chlorine atoms to form a penta-substituted mono-norbornenyl cyclotriphosphazene (4). Polymerization of 4 to yield structure 6 occurs upon contact of the monomer with the Grubbs initiatior (5) in solvents such as methylene chloride, chloroform, chlorobenzene, toluene, and benzene. The polymerizations are highly efficient and the yields are moderate to above average. The appearance of the resultant polymers range from viscous liquids to adhesive gums to elastomers to fibrous solids to hard glasses. The resultant properties are influenced, in part, by the molecular weight, choice of side groups, polymerization conditions (solvent, temperature, reaction time), and initiator used. Polymerizations also occur with the use of commercially available molybdenum-based Schrock type catalysts.

DETAILED DESCRIPTION OF THE INVENTION

Figure 1:
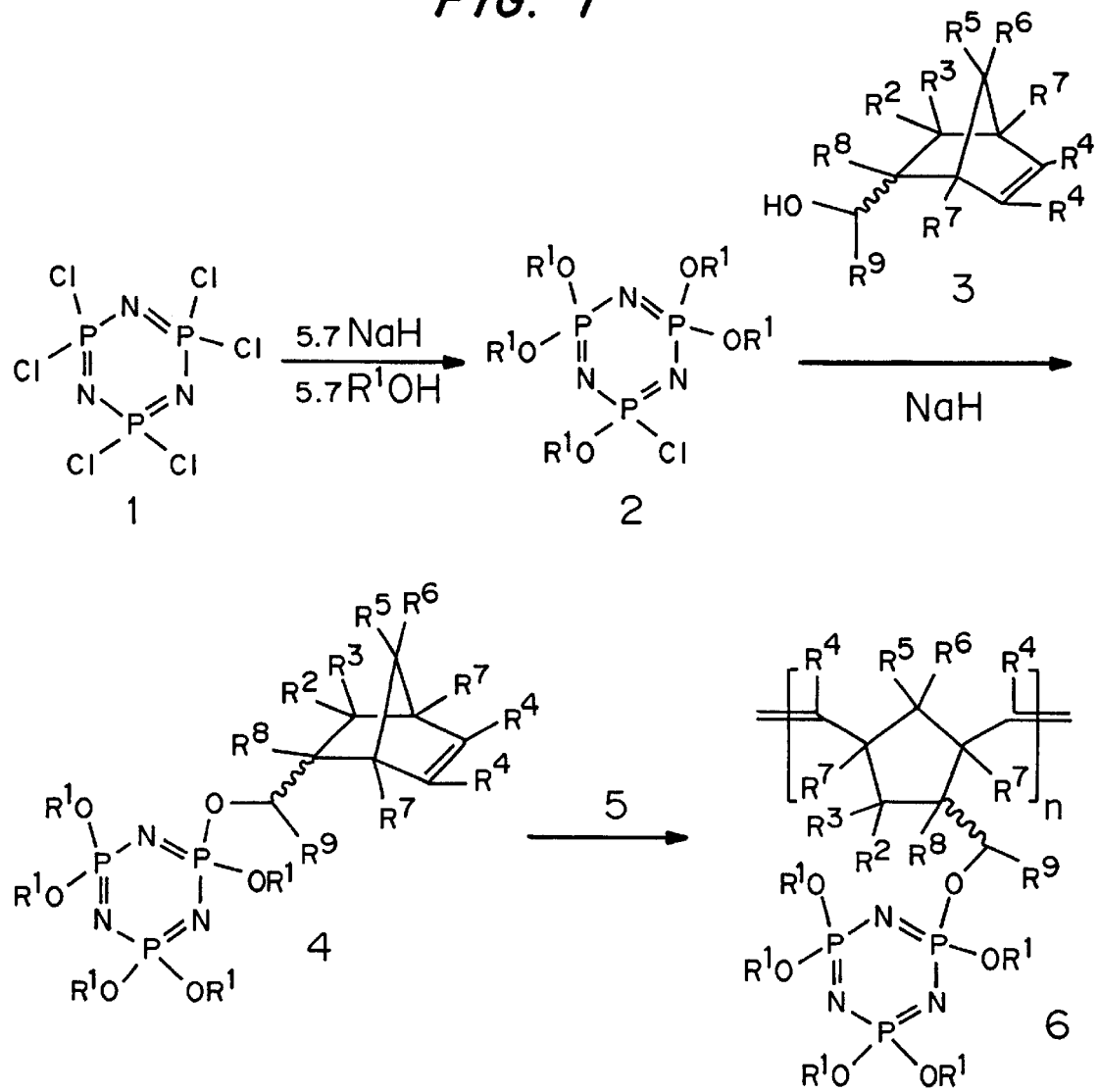
FIG. 1 illustrates one embodiment for the synthesis of polynorbornene compositions having pendant cyclotriphosphazene groups.
Figure 1:
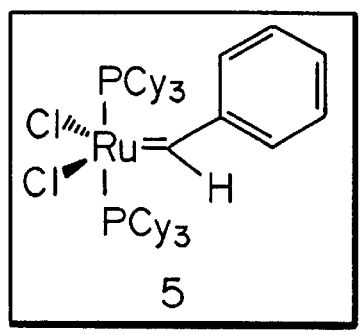

Methods have been developed to synthesize polynorbornene compositions having pendant cyclotriphosphazene groups.

I. Cyclotriphosphazene

Cyclotriphosphazene has an electronic structure closely resembling benzene. The three nitrogen (N) atoms and three phosphorous (P) atoms in cyclotriphosphazene constitute a six member ring. Each of the three N atoms adopts $SP^2$ hybridization. So does each of the three phosphorous atoms (Corbridge, D. E. C. Top. Phosphorus Chem. (1966), 3 57–394). The six P and N atoms are in a same plane. The six-member ring system has three alternating P—N single bonds and three alternating P=N double bonds. The average P—N distance in cyclotriphosphazene may be shorter than a normal P—N bond. On the other hand, the average P=N distance in cyclotriphosphazene may be longer than a normal P=N bond. Therefore, the P—N single bond and the P=N double bond are averaged, which is similar to the C—C and C=C bonds in benzene. In addition, the number of electrons in the close π-stacking system, which is six, satisfies the formula $4N+2$ wherein N is a positive integer. The cyclotriphosphazenes, therefore, have a resonance or π-stacking structure very close that in benzene. Such an electronic structure differs dramatically from the one in a linear phosphazene- or polyphosphazene material. Thus, the incorporation of cyclotriphosphazene groups into a polymeric molecule would have a marked effect upon properties of such polymeric molecule. In addition, the properties of such polymeric molecule would be different from those in a polymer molecule incorporating linear phosphazene groups.

In addition, the six-member ring of cyclotriphosphazene leaves significant room for further modification of the polymer composition. For example, various electrically withdrawing or electrically donating groups can be attached to the phosphorous atom to influence the d-π bonding between the d orbital and the π-stacking of the cyclophosphazene ring. See, Organophosphazenes. 16. The synthesis and reactions of 1-(alkoxyvinyl)-fluorocyclotriphosphazenes. Allen, et al., NTIS Report (TR-12; Order No. AD-A122591) Gov. Rep. Announce. Index (U.S.) 1983, 83(8), 1512; "Organophosphazenes. 16. Synthesis and reactions of(1-alkoxyvinyl)fluorocyclotriphosphazenes" Allen, et al., Inorg. Chem. (1983), 22(9), 1291–5; "Aryl-substituted fluorophosphazenes. VIII. Carbon-13 nuclear magnetic resonance parameters for phenyl-substituted fluorocyclotriphosphazenes" Allen, C. W. J. Organomet. Chem. (1977), 125(2), 215–18.

As described above in the background, currently known methods do not provide for the incorporation of intact cyclotriphosphazene groups into a polymeric composition through covalent-bonding.

Therefore, a polynorbornene composition having pendant cyclotriphosphazene groups would be highly desirable. Further, the repeating unit of the polynorbornene composition has a carbon-carbon double bond and a aromatic cyclotriphosphazene ring. The polynorbornene composition can be modified to attach different electronically withdrawing or electronically donating or hydrophobic or hydrophilic groups to the composition. Therefore, various materials can be made of such polynorbornene compositions.

II. Polynorbornene Compositions

Polynorbornenes with pendant cyclotriphosphazenes can be synthesized via ring-opening-metathesis-polymerization (ROMP) of olefins having a norbornene structure with a pendant cyclotriphosphazene group. The olefin can have various lower alkyl substituents while the cyclotriphosphazene group can have various electronically withdrawing or electronically donating groups.

Polymer compositions of Formula I having a polynorbornene backbone and pendant cyclotriphosphazene groups are provided:

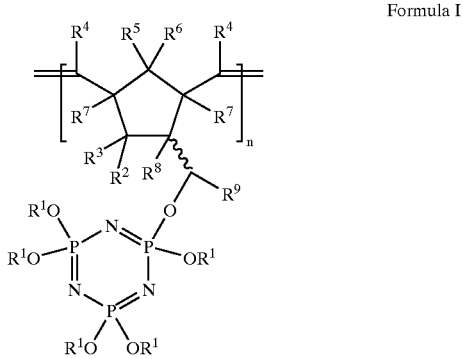

Formula I wherein $R^1$ is C1–C10 alkyl, C1–C10 haloalkyl, C3–C6 cycloalkyl, phenyl, substituted phenyl, aryl, —(CH$_2$CH$_2$OCH$_2$CH$_2$)$_n$OCH$_3$ in which n is a positive integer, aminoalkyl, alkoxyalkyl, phenoxyalkyl, aryloxyalkyl and amidoalkyl; and wherein R$^2$, R$^3$, R$^4$, R$^5$, R$^6$, R$^7$, R$^8$ and R$^9$ are H, CH$_3$, X which is a halo group, and C2–C6 alkyl, C3–C6 cycloalkyl, C2–C6 alkoxy, phenoxy, and aryloxy.

In one preferred embodiment, R$^1$ is either —CH$_2$CF$_3$, phenyl, 4-ethylcarboxylatophenyl, —CH$_2$CH$_3$ or —CH$_2$CH$_2$OCH$_2$CH$_2$OCH$_3$. In one of most preferred embodiment, R$^1$ is —CH$_2$CF$_3$.

The preferred polymer compositions are wherein R$^2$, R$^3$, R$^4$, R$^5$, R$^6$, R$^7$, R$^8$ and R$^9$ are H, CH$_3$, or CH$_2$CH$_3$. The most preferred polymer compositions are wherein R$^2$, R$^3$, R$^4$, R$^5$, R$^6$, R$^7$, R$^8$ and R$^9$ are H groups.

Exemplary polymer compositions of the present invention are:

poly{[(5-norbornene-2-methoxy)pentaphenoxy]cyclotriphosphazene};

poly{[(5-norbornene-2-methoxy)penta(trifluoroethoxy)]cyclotriphosphazene};

poly{[(5-norbornene-2-methoxy)penta(4-ethylcarboxylatophenoxy)]cyclotriphosphazene}; and poly{[(5-norbornene-2-methoxy)pentaethoxy]cyclotriphosphazene}.

III. Synthesis

In a preferred embodiment, synthesis of the polynorbornenes with pendant cylcotriphosphazene groups is performed via ring opening metathesis polymerization (ROMP) reaction of olefins having a norbornene structure with a cyclotriphosphazene group in the presence of a catalyst such as 5, as outlined in FIG. 1.

The term "ring opening metathesis polymerization" (ROMP) as used herein means

ROMP is a specific type of ring opening polymerization which is driven predominantly by the release of ring strain. It is a process that involves simultaneous bond breaking and bond formation. Metathesis comes from the Greek words meta (change) and tithemi (place) and involves the switching of ligands on two olefins. In the context of this work, the norbornenyl portion of the phosphazene functionalized monomer reacts with Grubbs initiator to undergo ring opening at the olefinic functional group. The ligands of the olefin monomer and olefin catalyst also switch places. As a result, the initiating species is chemically different that the propagating species. Upon initiation, propagation occurs with the successive addition of monomer. Typically the molecular weight increases continuously as the reaction proceeds, until all the monomer is consumed. Olefin catalysts are typically based on transition metals. Catalysts that incorporate tungsten or molybdenum have been widely used. However, titanium, osmium, ruthenium, vanadium and iridium catalysts can also been used. A distinctive feature of ROMP is that double bonds are present in both monomer and resultant polymer. Because of this, the double bonds of the polymer can also be reactive to transition metal complexes. Therefore, the reactions must be carefully monitored to prevent backbiting and other side reactions. Large polydispersities and low molecular weights are usually attributed to these side reactions. The advent of Schrock and Grubbs type initiators has allowed for the development of polymers with controlled molecular weights and narrow polydispersities. ROMP with Schrock initiators occur in an analogous manner to living chain anionic polymerizations of vinyl monomers such as styrene. The initiator polymerizes the total monomer present, but does not terminate. This is ideal for the synthesis of block copolymers since new monomers can be added to the reaction pot at any time throughout the course of a polymerization.

R$^1$ can be attached to the cyclotriphosphazene ring via replacement of the five halo groups in a hexahalocyclotriphosphazene molecule. In one embodiment, sodium phenoxide can be allowed to react with a hexahalocyclotriphosphazene such as hexachlorocyclotriphosphazene (1) to generate (pentaphenoxy)(monochloro)cyclotriphosphazene (2a). In another embodiment, trifluoroethoxide can be allowed to react with 1 to generate [penta(trifuoroethoxy)](monochloro)cyclotriphosphazene (2b). In still another embodiment, sodium 4-ethylcarboxylatophenoxide or ethoxide can be allowed to react in a solvent such as to replace the five chloro groups to make [penta(4-ethylcarboxylatophenoxy)](monochloro)cyclotriphosphazene (2c) and (2d), respectively.

The attachment of a cyclotriphosphazene group to a norbornene group can be carried out via reaction of a norbornenyl alcohol such 5-norbornene-2-methanol (3) with 2 in the presence of a base such as NaH. In one embodiment, monomer [(5-norbornene-2-methoxy)pentaphenoxy]cyclotriphosphazene (4a) can be synthesized using 2a and 3. In another embodiment, monomer [(5-norbornene-2-methoxy)penta(trifluoroethoxy)]cyclotriphosphazene (4b) can be synthesized using 2b and 3. In still another embodiment, monomer [(5-norbornene-2-methoxy)penta(4-ethylcarboxylatophenyl)]cyclotriphosphazene (4c) can be synthesized using 2c and 3. In still another embodiment, [(5-norbornene-2-methoxy)pentaethoxy]cyclotriphosphazene (4d) can be synthesized using 2d and 3.

Monomers 4 then are subject to ROMP reaction in the presence of a catalyst such as 5 to generate polymers 6. In one embodiment, monomer 4a can be subjected to ROMP reaction in the presence of 5 to generate poly{[(5-norbornene-2-methoxy)pentaphenoxy]cyclotriphosphazene} (6a). In another embodiment, monomer 4b can be subject to ROMP reaction in the presence of 5 to generate poly{[(5-norbornene-2-methoxy)penta(trifluoroethoxy)] cyclotriphosphazene}(6b). In still another embodiment, monomer 4c can be subject to ROMP reaction in the presence of 5 to generate poly{[(5-norbornene-2-methoxy)penta(4-ehtylcarboxylatophenoxy)]cyclotriphosphazene} (6c). In another embodiment, monomer 4d can be subject to ROMP reaction in the presence of 5 to generate poly{[(5-norbornene-2-methoxy)pentaethoxy]cyclotriphosphazene} (6d).

In general, five major components are needed for the successful polymerization of monomers described herein: 1) a cyclotriphosphazene ring, 2) a nucleophile that can be attached to the phosphazene ring, 3) a norbornene derivative that can be attached to the phosphazene ring, 4) an initiator as described herein, and 5) a solvent as described herein.

Hexachlorocyclotriphosphazene is treated with a variety of nucleophiles to yield a pentasubstituted cyclotriphosphazene. This leaves a single chlorine atom available for attachment of the norbornenyl group. If more than one chlorine atom is left available to react with the norbornenyl group, then branching and crosslinking will occur. Thus, the correct stoichiometry is important. Polymerization of the pentasubstituted mono-norbornenyl cyclotriphosphazene results in polymers with controlled molecular weights and moderate to high yields.

IV. Applications for the Polymer Compositions

The polymer compositions disclosed herein have many applications. Exemplary applications include use as elastomers, optical materials, electrically conductive materials, biomedical materials, compatibilizing agents, surfactants, additives for coatings, and flame retardants. In one embodiment, a polynorbornene composition can be used as an electric conductor or as linear or nonlinear optical materials. Also, because of the hydrophobic and elastomeric nature of some of the disclosed polynorbornene compositions, the polyborbornene compositions can be used as vascular graft materials. The ester group in 6c can be cleaved by strong base to form free carboxylate groups which can be further cross-linked by divalent cations such as $Ca^{++}$ via the carboxylate groups to yield hydrogels which have a number of potential applications in the medical and industrial areas. Some of other compositions with oxyethylene groups on the phosphazene ring can act as binding sites for metal salts. Therefore, the polymers can have ionic conductivity behavior and thus be useful for battery applications.

The polymers and methods described herein can be further understood by the following non-limiting examples.

EXAMPLES

Overview

All manipulations were carried out under an inert and dry atmosphere such as one provided by dry argon using standard Schlenk line techniques. The compounds were identified following standard organic and inorganic analytical procedures using standard analytical equipment: i.e., Bruker WM360 spectrometer operated at 146, 90.27, and 360 MHz, respectively, for $^{31}P$, $^{13}C$, or $^1H$ NMR spectroscopy; Perkin-Elmer 1600 series FT-IR spectrometer for IR spectra; Hewlett-Packard HP 1090 gel permeation chromatograph equipped with two Phenomenex Phenogel linear 10 columns and a Hewlett-Packard 1047A refractive index detector for gel permeation chromatograms; Hewlett-Packard Chemstation equipped with Hewlett-Packard and Polymer Laboratories software for data collection and calculations; Perkin-Elmer DSC-7 differential scanning calorimeter controlled by a PE7500 computer for Differential scanning calorimetry. Heating rates of 10–40° C./min and sample sizes of 20–30 mg were used. Elemental analysis was performed by Quantitative Technologies, Inc.

Materials

Hexachlorocyclotriphosphazene was isolated from a cyclic trimer-tetramer mixture by sublimation. All other materials were either purchased from distributors such as Aldrich or prepared following standard procedures in organic or inorganic synthesis. The organic solvents were purified and dried following standard procedure. Examples of organic solvents are oxygen containing solvents and halogenated solvents such as tetrahydrofuran ("THF") and methylene chloride.

Example 1

Preparation of pentaphenoxy(monochloro)]cyclotriphosphazene (2a)

A solution of 30.9 g of phenol (328 mmol) in 200 mL of dry THF was added dropwise to a stirred suspension of 7.9 g of NaH (328 mmol, 60% dispersion in mineral oil) in 100 mL of dry THF, all at room temperature. The mixture was stirred at room temperature overnight and was then added dropwise to a stirred solution of 20 g of hexachlorocyclotriphosphazene (1) (57.5 mmol) in 150 mL of dry THF. The mixture was refluxed overnight, cooled to room temperature, and washed with 5% HCl (3×50 mL). The organic layer was concentrated and purified by column chromatography (silica, 55/45$CH_2Cl_2$/hexanes) to yield 15 g (47%) of a white solid 2a. Identification and characterization data are listed as follows: $^1H$ NMR ($CDCl_3$): 6.96 (aromatic); $^{13}C$ NMR ($CDCl_3$): 147.1, 140.0,127.8,119.6; $^{31}p$ NMR ($CDCl_3$): 22.88 (t, 1P), 7.6 (d, 2P); Mass spectroscopy (m/e): 636 $MH^+$.

Example 2

Preparation of [(5-norbornene-2-methoxy)pentaphenoxy]cyclotriphosphazene (4a)

A solution of 4.0 g of 5-norbornene-2-metnanol (3) (32 mmol) in 50 mL of dry THF was added dropwise to a stirred suspension of 1.3 g of NaH (32 mmol, 60% dispersion in mineral oil) in 100 mL of dry THF at room temperature. The mixture was stirred at room temperature overnight and was then added dropwise to a stirred solution of 17.9 g of 2a (32.4 mmol) in 300 mL of dry THF at room temperature. The reaction was allowed to warm to room temperature and was then refluxed gently overnight, cooled to room temperature, and quenched with water. The organic layer was concentrated and then dried under high vacuum for 48 hours to yield 3.0 g (89%) of a viscous noncrystallizable oil 4a containing both endo and exo isomers. Identification and characterization data for 4a are listed as follows: $^1H$ NMR ($CDCl_3$) (exo and endo isomers) 7.17–6.85 (m, 25H), 5.95 (dd, 1H), 5.72 (dd, 1H), 3.45–3.30 (m, 1H), 3.20–3.05 (m, 1H), 2.70–2.66 (m, 2H), 2.10 (m, 1H), 1.54 (m, 1H), 1.44(m, 1H), 1.30 (m, 1H), 1.15 (m, 1H), 1.06 (m, 1H), 0.98 (m, 1H), 0.82 (m, 1H), 0.20 (m, 1H); $^{13}C$ NMR ($CDCl_3$) 151.2, 137.3, 132.8, 129.9, 125.3, 121.6, 70.0, 49.7, 45.3, 44.0, 42.0, 39.3, 28.9; $^{31}P$ NMR ($CDCL_3$): 13.4–11.9 (m 1P), 9.9–9.3 (m 2P); Mass spectroscopy (m/e) 724 $M^+$.

Example 3

Preparation of Penta[(trifluoroethoxy)(monochloro)]cyclotriphosphazene (2b)

A solution of 37.4 g (364 mmol) of trifluoroethanol in 200 mL of dry THF was added dropwise to a stirred suspension of 14.9 g of NaH (364 mmol, 60% dispersion in mineral oil) in 100 mL of dry THF at room temperature. The mixture was stirred at room temperature overnight and was then added dropwise to a stirred solution of 22.8 g of 1 (65.6 mmol) in 150 mL of dry THF at −30° C.

The mixture was allowed to warm to room temperature and was then refluxed overnight, cooled to room temperature, and used for the subsequent synthesis of 4b. Identification and characterization data for 2b are listed as: $^{31}P$ NMR ($D_2O$) δ 27.3 (t, 1P), 17.8 (s, 3P) (hexa), 15.3 (d, 2P).

Example 4

Preparation of [(5-norbornene-2-methoxy)penta(trifluoroethoxy)]cyclotriphosphazene (4b)

A solution of 8.1 g of 3 (66 mmol) in 20 mL of dry THF was added dropwise to a stirred suspension of 2.6 g of NaH (66 mmol, 60% dispersion in mineral oil) in 80 mL of dry THF at room temperature. The mixture stirred at room temperature overnight and was then added dropwise to a stirred solution of 43.7 g (66 mmol) of 2b in 300 mL of dry THF at room temperature. The reaction was allowed to warm to room temperature and was then refluxed gently overnight, cooled to room temperature, and quenched with water. The organic layer was concentrated and the crude product purified by column chromatography (silica, 50/50 hexanes/ethylacetate). The resulting oil was fractionally distilled twice under reduced pressure to yield 29 g (58%) of a clear and colorless oil (4b) containing both endo and exo isomers. Identification and characterization data for 4b are listed as: $^1H$ NMR ($CDCl_3$) (exo and endo isomers) δ 6.08 (dd, 1H), 6.06 (dd, 1H), 6.00 (dd, 1H), 5.90 (dd, 1H), 4.19 (m, 10H), 3.97 (m, 1H), 3.79 (m, 1H), 3.64 (m, 1H), 3.51 (m, 1H), 2.82–2.66 (m, 2H), 2.36 (m, 1H), 2.00 (m, 1H), 1.73 (m, 1H), 1.41 (m, 1H), 1.29 (m, 1H), 1.19 (m, 1H), 1.06 (m, 1H), 0.79 (m, 1H), 0.42 (m, 1H); $^{13}$C NMR (CDCl$_3$) δ 137.9, 136.0, 131.8, 71.0, 70.9, 63.7–62.3, 49.2, 44.6, 43.7, 39.2, 29.1; $^{31}$P NMR (CDCl$_3$) δ 18.3–17.6 (m, 2P), 16.8–15.5, (m 1P), Mass spectroscopy (m/e) 753 M$^+$.

Example 5

Preparation of Penta[(4-ethylcarboxylatophenoxy) (monochloro)]cyclotriphosphazene (2c)

A solution of 4-ethylhydroxybenzoate (68.1 g, 410 mmol) in 300 mL of dry THF was added dropwise to a stirring suspension of NaH (16.4 g, 410 mmol, 60% dispersion in mineral oil) in 200 mL of dry THF at room temperature. The mixture was stirred at room temperature overnight and was then added dropwise to a stirred solution of 25 g of 1 (71.9 mmol) in 150 mL of dry THF. The mixture was refluxed overnight, cooled to room temperature, and washed with 5% HCl (3×50 mL). The organic layer was concentrated and purified by column chromatography (silica, 70/30 hexanes/ ethylacetate) to yield 40 g (49%) of a noncrystallizable oil 2c. Identification and characterization data for 2c are listed as: $^1$H NMR (CDCl$_3$) δ 7.91 (m, 10H), 7.05 (m, 10H), 4.32 (q, 10H), 1.33 (t, 15H); $^{31}$P NMR (CDCl$_3$) δ 21.39 (t, 1P), 5.86 (d, 2P).

Example 6

Preparation of [(5-norbornene-2-methoxy)penta(4-ethylcarboxylatophenoxy)]cyclotriphosphazene (4c)

A solution of 1.56 g of 3 (124 mmol) in 20 mL of dry THF was added dropwise to a stirred suspension of 0.48 g of NaH (12 mmol, 60% dispersion in mineral oil) in 50 mL of dry THF at room temperature. The mixture stirred at room temperature overnight and was then added dropwise to a stirred solution of 10 g of 2c (10 mmol) in 150 mL of dry THF at room temperature. The mixture was allowed to warm to room temperature and was then refluxed gently overnight, cooled to room temperature, and quenched with water. The organic layer was concentrated and the product dried under high vacuum with gentle heating for 72 hours to yield 8 g (71%) of a viscous noncrystallizable oil 4c containing both endo and exo isomers. Identification and characterization data of 4c are listed as: $^1$H NMR (CDCl$_3$) (exo and endo isomers) δ 7.85 (d, 10H, 7.01 (d, 10H), 6.10 (dd, 1H), 5.92 (dd, 1H), 4.29 (m, 10H), 4.16–4.02 (m, 1H) 3.82–3.71 (m, 1H), 2.85 (m, 1H), 2.74 (m, 1H), 2.68 (m, 1H), 2.62 (m, 1H), 2.44 (m, 1H), 2.04 (m, 1H), 1.81 (m, 1H), 1.37 (m, 1H), 1.26 (m, 15H), 1.17 (m, 1H), 1.09 (m, 1H), 0.78 (m, 1H), 0.56 (m, 1H); $^{13}$C NMR(CDCl$_3$) δ 165.4, 153.8, 137.6, 132.1, 131.0, 126.6, 120.4, 68.4, 63.3, 61.0, 49.3, 43.9, 42.1, 37.8, 28.9, 15.6, 14.2; $^{31}$P NMR (CDCl$_3$) δ 11.0–12.3 (m, 1P), 8.0–8.6 (m, 2P); Mass spectroscopy (m/e) 1084 M$^{30}$.

Example 7

Preparation of [pentaethoxy(monochloro)] cyclotriphosphazene (2d)

A solution of 12.3 g of ethanol (268 mmol) in 50 mL of dry THF was added dropwise to a stirred suspension of 10.7 g of NaH (364 mmol, 60% dispersion in mineral oil) in 100 mL of dry THF at room temperature. The mixture was stirred while refluxing overnight, cooled to room temperature, and added dropwise to a stirred solution of 17.6 g of 1 (50.5 mmol) in 200 mL of dry THF at room temperature. The mixture was allowed to reflux overnight, cooled to room temperature, and used for the subsequent synthesis of 4d. Identification and characterization data for 2d are listed as: $^{31}$P NMR (D$_2$O) d 27.80 (t, 1P), 18.8 (s, 3P) (hexa), 15.8 (d, 2P).

Example 8

Preparation of [(5-norbornene-2-methoxy) pentaethoxy]cyclotriphosphazene (4d)

A solution of 9.5 g of 3 (77 mmol) in 50 mL of dry THF was added dropwise to a stirred suspension of 3.1 g of NaH (77 mmol, 60% dispersion in mineral oil) in 50 mL of dry THF at room temperature. The mixture was stirred overnight at room temperature, then added dropwise to a stirred solution of 19.9 g of 2d (50.5 mmol) in 500 mL of dry THF at room temperature. The mixture was allowed to reflux overnight, cooled to room temperature, and quenched with water. The organic layer was concentrated and the resultant oil purified by column chromatography (70/30 hexanes/ ethylacetate) to yield 13 g (53%) of clear colorless oil 4d. Identification and characterization data for 4d are listed as: $^1$H NMR (CDCl$_3$) (exo and endo isomers) 6.07 (dd, 1H), 6.06 (dd, 1H), 6.02 (d, 1H), 5.93 (d, 1H), 3.93 (m, 10H), 3.73 (m, 1H), 3.62 (m, 1H), 3.42 (m, 1H), 2.90 (m, 1H), 2.72 (m, 1H), 2.39 (m, 1H), 1.99 (m, 1H), 1.72 (m, 1H), 1.33 (m, 1H), 1.23 (m, 1H), 1.22 (m, 15H), 1.21 (m, 1H), 1.18 (m, 1H), 1.09 (m, 1H), 0.46 (m, 1H); $^{31}$P NMR (D$_2$O) 27.8 (t, 1P), 18.8 (s, 3P), 15.8 (d, 2P); Mass spectroscopy (m/e) 484 M$^+$.

Example 9

Poly{[(5-norbornene-2-methoxy)pentaphenoxy] cyclotriphosphazene} (6a)

A polymerization reaction was conducted as follows. Under an inert atmosphere, a 20 mL vial was charged with 4.75 g of degassed 4a (3.64 mmol) and a magnetic stirrer. A solution of 15 mg of 5 (0.018 mmol) ([4a]/[5]=200) in 1 mL of methylene chloride was added to the vial via pipet. The vial was capped and stirred at room temperature. Within 2 minutes, the dark red solution became progressively more viscous, and after 10 minutes the contents of the vial were solid. After 24 h the polymer gel was transferred to a separate container and 0.5 mL ethyl vinyl ether, and 50 mL of chloroform were added. Most of the solid dissolved. The soluble portion was poured into 500 mL of methanol and stirred. The off-white solid that precipitated was collected, and dried overnight under vacuum to yield 2.4 g 6a (50%) (Table 1). 6a was characterized by $^1$H, $^{13}$C, $^{31}$P NMR spectroscopy and C, H, N analysis. The data for 6a are presented below: $^1$H NMR (CDCl$_3$) δ 7.18–6.85 (m, 25H), 5.47–4.98 (bd 2H, 3.62–3.01 (bm, 4H), 2.98 (bm, 1H), 2.71 (bm, 1H), 2.68 (bm, 1H), 2.12 (bs, 1H), 1.95 (bs, 1H), 1.55 (bm, 1H), 1.29 (bm, 1H), 1.17 (m, 1H), 1.03 (m, 1H), 0.98 (m, 1H), 0.80 (m, 1H); $^{13}$C NMR (CDCl$_3$) δ 1 51.1, 137.4–132.6 (backbone C-olefin), 130.0, 124.9, 121.7, 69.2, 49.8, 45.4–39.1 (backbone C-alkyl), 29.1; $^{31}$P NMR (CDCl$_3$) δ 13.2–12.1 (t, 1P), 9.7–9.1 (d, 2P); Anal. Calculated for C$_{38}$H$_{36}$O$_6$N$_3$P$_3$: C, 63.07; H, 5.01; N, 5.81; Found: C, 63.18; H, 5.10; N, 5.65.

Example 10

Poly{[(5-norbornene-2-methoxy)penta (trifluoroethoxy)]cyclotriphosphazene} (6b)

A polymerization reaction was conducted as follows. Under an inert atmosphere, a 20 mL vial was charged with 4.75 g of degassed 4b (3.64 mmol) and a magnetic stirrer. A solution of 15 mg of 5 (0.018 mmol) ([4b]/[5]=200) in 1 mL of methylene chloride was added to the vial via pipet. The vial was capped and stirred at room temperature. Within 2 minutes the dark red solution became progressively more viscous, and after 10 minutes the contents of the vial were solid. After 24 h the polymer gel was transferred to a separate container and 0.5 mL ethyl vinyl ether, and 50 mL of chloroform were added. Most of the solid dissolved. The soluble portion was poured into 500 mL of methanol and stirred. The off-white solid that precipitated was collected, and dried overnight under vacuum to yield 2.4 g 6b (50%) (Table 1). 6b was characterized by $^1$H, $^{13}$C, $^{31}$P NMR spectroscopy and C, H, N analysis. The characterization data for 6b are presented below: $^1$H NMR (CDCl$_3$) 5.54–5.03 (bd, 2H), 4.25 (bs, 10H), 4.00 (bm, 1H), 3.81 (bm, 1H), 3.70 (m, 1H), 2.92 (bm, 1H), 2.73 (bm, 1H), 2.33 (m, 1H), 1.95 (bs, 1H), 1.48 (bm, 1H), 1.17 (m, 1H), 0.75 (m, 1H); $^{13}$C NMR (CDCl$_3$) 137.8, 136.0, 137.3–133.6 (backbone C-olefin), 123.9, 70.7, 62.8, 48.8–43.4 (backbone C-alkyl), 43.3, 39.3, 29.1; $^{31}$P NMR (CDCl$_3$) 18.3–17.5 (m, 2P), 16.8–15.6 (m, 1P); Anal. Calculated for C$_{18}$H$_{21}$O$_6$N$_3$P$_3$F$_{15}$: C, 28.70; H, 2.81; N, 5.58 and Anal. Found: C, 28.02; H, 2.47; N, 5.31.

Example 11

Poly{[(5-norbornene-2-methoxy)penta(4-ethylcarboxylatophenoxy)]cyclotriphosphazene} (6c)

A polymerization reaction was conducted as follows. Under an inert atmosphere, a 20 mL vial was charged with 4.75 g of degassed 4c (3.64 mmol) and a magnetic stirrer. A solution of 15 mg of 5 (0.018 mmol) ([4c]/[5]=200) in 1 mL of methylene chloride was added to the vial via pipet. The vial was capped and stirred at room temperature. Within 2 minutes the dark red solution became progressively more viscous, and after 10 minutes the contents of the vial were solid. After 24 h the polymer gel was transferred to a separate container and 0.5 mL ethyl vinyl ether, and 50 mL of chloroform were added. Most of the solid dissolved. The soluble portion was poured into 500 mL of methanol and stirred. The off-white solid that precipitated was collected, and dried overnight under vacuum to yield 2.4 g 6c (50%) (Table 1). 6c was characterized by $^1$H, $^{13}$C, $^{31}$P NMR spectroscopy and C, H, N analysis. The data for 6c are presented below: $^1$H NMR (CDCl$_3$) 7.82 (d, 10H), 7.00 (d, 10H), 5.52–5.01 (bd, 2H), 4.31 (m, 10H), 4.02–3.88 (bm, 2H), 3.70 (m, 1H), 3.01 (bm, 1H), 2.62 (bm, 1H), 2.40 (bs, 1H), 1.91 (bs, 1H), 1.50 (bm, 1H), 1.28 (m, 15H), 1.12 (m, 1H), 1.02 (m, 1H), 0.72 (m, 1H); $^{13}$C NMR (CDCl$_3$) 165.4, 153.5, 138.6–134.6 (backbone C-olefin), 131.2, 127.7 120.7, 67.6, 63.4 61.1, 47.1–36.0 (backbone C-alkyl), 29.7, 15.8, 14.3; $^{31}$P NMR (CDCl$_3$) 18.3–17.6 (m, 2P), 16.9–15.6 (m, 1P); Anal. Calculated for C$_{53}$H$_{56}$O$_6$N$_3$P$_3$: C, 58.73; H, 5.21; N, 3.88; Anal. Found: C, 59.14; H, 5.21; N, 3.60.

Example 12

Poly{[(5-norbornene-2-methoxy)pentaethoxy]cyclotriphosphazene} (6d)

A polymerization reaction was conducted as follows. Under an inert atmosphere, a 20 mL vial was charged with 4.75 g of degassed 4d (3.64 mmol) and a magnetic stirrer. A solution of 15 mg of 5 (0.018 mmol) ([4d]/[5]=200) in 1 mL of methylene chloride was added to the vial via pipet. The vial was capped and stirred at room temperature. Within 2 minutes the dark red solution became progressively more viscous, and after 10 minutes the contents of the vial were solid. After 24 h the polymer gel was transferred to a separate container and 0.5 mL ethyl vinyl ether, and 50 mL of chloroform were added. Most of the solid dissolved. The soluble portion was poured into 500 mL of methanol and stirred. The off-white solid that precipitated was collected, and dried overnight under vacuum to yield 2.4 g 6d (50%) (Table 1). 6d was characterized by $^1$H, $^{13}$C, $^{31}$P NMR spectroscopy and C, H, N analysis. The data for 6d are presented below: $^1$H NMR (CDCl$_3$) δ 5.51–5.02 (bd, 2H), 3.87 (bs, 10H, 2.90 (bm, 1H), 2.66 (bm, 1H), 2.31 (bs, 1H), 1.88 (bs, 1H), 1.78 (bm, 1H), 1.62–0.20 (bm, 15H); $^{13}$C NMR (CDCl$_3$) δ 135.9, 133.9, 135.2–131.2 (backbone C-olefin), 124.0, 67.6, 61.7, 47.6–37.8, 34.4, 30.4, 16.1; $^{31}$P NMR (D$_2$O) δ 20.4–17.5 (bm, penta+hexa-substituted); Anal. Calculated for C$_{18}$H$_{36}$O$_6$N$_3$P$_3$C, 44.72; H, 7.51; N, 8.69; Anal. Found C, 46.10; H, 7.17; N, 7.67.

TABLE 1

Polymerization Results for Norbornenes 4a, 4b, 4c, 4d

| entry | monomer | [4]/[5] | $10^{-3} M_n{}^a$ | PDI$^a$ | $T_g{}^b$ (° C.) |
|---|---|---|---|---|---|
| 1 | 4a | 11 | 8.8 | 1.5 | 25.6 |
| 2 | 4a | 25 | 14.4 | 1.6 | 25.7 |
| 3 | 4a | 69 | 47.2 | 1.8 | 23.6 |
| 4 | 4b | 13 | 28.6 | 1.7 | −44.1 |
| 5 | 4b | 29 | 44.9 | 1.7 | −36.3 |
| 6 | 4b | 50 | 66.4 | 1.9 | −28.6 |
| 7 | 4b | 89 | 44.0$^c$ | 1.5 | −18.6 |
| 8 | 4b | 205 | c | c | −11.1 |
| 9 | 4c | 9 | 13.0 | 1.6 | 36.3 |
| 10 | 4c | 23 | 21.0 | 1.8 | 32.2 |
| 11 | 4c | 57 | 27.8 | 1.6 | 28.3 |
| 12 | 4c | 105 | 44.0$^c$ | c | 6.6 |
| 13 | 4d | 25 | 15.8 | 1.5 | d |
| 14 | 4d | 100 | 34.3 | 2.2 | −15.7 |

$^a$Determined by GPC in THF using polystyrene standards.
$^b$Analysis by differential scanning calorimetry with a scan rate of 10° C./min.
$^c$Polymers were mostly insoluble in THF.
$^d$No thermal transitions were observed.

Those skilled in the art will recognize, or be able to ascertain using no more than routine experimentation, many equivalents to the specific embodiments of the present application described herein. Such equivalents are intended to be encompassed by the following claims.

We claim:

1. A polymer composition comprising a polynorbornene backbone and a cyclotriphosphazene pendant group, having the formula

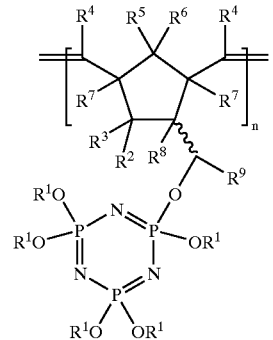

wherein R$^1$ is C1–C10 alkyl, C1–C10 haloalkyl, C3–C6 cycloalkyl, phenyl, substituted phenyl, aryl, alkylcarboxylatophenyl, —(CH$_2$CH$_2$OCH$_2$CH$_2$)$_n$OCH$_3$ in which n is a positive integer, aminoalkyl, alkoxyalkyl, phenoxyalkyl, aryloxyalkyl or amidoalkyl; and wherein R$^2$, R$^3$, R$^4$, R$^5$, R$^6$, R$^7$, R$^8$ and R$^9$ are groups selected from the group consisting of H, CH$_3$, X which is a halo group, C2–C6 alkyl, C3–C6 cycloalkyl, C2–C6 alkoxy, phenoxy, and aryloxy.

2. The polymer composition of claim 1 wherein R$^2$, R$^3$, R$^4$, R$^5$, R$^6$, R$^7$, R$^8$ and R$^9$ are H groups.

3. The polymer composition of claim 2 wherein R$^1$ is a group selected from the group consisting of phenyl, —CH$_2$CF$_3$, alkylcarboxylatophenyl, and —CH$_2$CH$_2$OCH$_2$CH$_2$OCH$_3$.

4. The polymer composition of claim 2 wherein R$^1$ is phenyl.

5. The polymer composition of claim 2 wherein R$^1$ is 4-ethylcarboxylatophenyl.

6. The polymer composition of claim 2 wherein R$^1$ is —CH$_2$CH$_2$OCH$_2$CH$_2$OCH$_3$.

7. An article of manufacture comprising a polymer composition comprising a polynorbornene backbone and a cyclotriphosphazene pendant group, having the formula

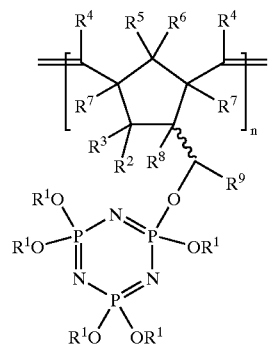

wherein R$^1$ is C1–C10 alkyl, C1–C10 haloalkyl, C3–C6 cycloalkyl, phenyl, substituted phenyl, aryl, alkylcarboxylatophenyl, —(CH$_2$CH$_2$OCH$_2$CH$_2$)$_n$OCH$_3$ in which n is a positive integer, aminoalkyl, alkoxyalkyl, phenoxyalkyl, aryloxyalkyl or amidoalkyl; and wherein R$^2$, R$^3$, R$^4$, R$^5$, R$^6$, R$^7$, R$^8$ and R$^9$ are groups selected from the group consisting of H, CH$_3$, X which is a halo group, C2–C6 alkyl, C3–C6 cycloalkyl C2–C6 alkoxy, phenoxy, and aryloxy.

8. The article of claim 7 wherein the polymer composition is an elastomer.

9. The article of claim 7 wherein the polymer composition is selected from the group consisting of a linear optical material, a nonlinear optical material, and an electrically conductive material.

10. The article of claim 7 wherein the polymer composition is biocompatible.

11. The article of claim 9 wherein the composition is a battery material.

12. The article of claim 7 wherein the polymer composition is a flame retardent.

* * * * *